(12) United States Patent
Doi

(10) Patent No.: US 7,133,578 B2
(45) Date of Patent: Nov. 7, 2006

(54) OPTICAL MODULATOR WITH AN IMPEDANCE MATCHING REGION

(75) Inventor: Masaharu Doi, Isehara (JP)

(73) Assignee: Fujitsu Limited, Kanagawa (JP)

( * ) Notice: Subject to any disclaimer, the term of this patent is extended or adjusted under 35 U.S.C. 154(b) by 55 days.

(21) Appl. No.: 10/798,853

(22) Filed: Mar. 12, 2004

(65) Prior Publication Data
US 2005/0013522 A1    Jan. 20, 2005

(30) Foreign Application Priority Data
Jul. 17, 2003    (JP) .............................. 2003-198553

(51) Int. Cl.
*G02F 1/035* (2006.01)
(52) U.S. Cl. .................... 385/3; 385/1; 385/2
(58) Field of Classification Search .................. 385/1, 385/2, 3
See application file for complete search history.

(56) References Cited

U.S. PATENT DOCUMENTS

| 6,400,490 B1 * | 6/2002 | Hosoi .......................... 359/254 |
| 2002/0106141 A1 * | 8/2002 | Gopalakrishnan .............. 385/2 |
| 2003/0147575 A1 * | 8/2003 | Sugiyama et al. ............. 385/2 |

* cited by examiner

*Primary Examiner*—Jennifer Doan
(74) *Attorney, Agent, or Firm*—Bingham McCutchen LLP

(57) ABSTRACT

An apparatus for eliminating reflection of an input electric signal by providing an impedance matching region between an input region and mutual operation region is disclosed. The impedance may be adjusted by varying the width of a signal electrode and the interval between the signal electrode and ground electrodes. The apparatus preferably eliminates any reflection of signals in a Mach-Zehnder optical modulator that is generated when velocity matching is performed for the light propagated through the optical waveguide and the electric signal propagated through the signal electrode and an electrode interval is varied for lowering the drive voltage because an impedance of the mutual operation region becomes lower than the input impedance.

12 Claims, 7 Drawing Sheets (a)

(b)

OPTICAL MODULATOR WITH AN IMPEDANCE MATCHING REGION

FIELD OF THE INVENTION

The present invention relates to an optical modulator used for optical communication and particularly to a Mach-Zehnder optical modulator in which an optical waveguide is formed on a substrate having the electro-optical effect.

BACKGROUND OF THE INVENTION

In an optical transmission system, a wavelength division multiplexing (WDM) communication is widely used to increase transmission capacity by multiplexing a plurality of signal lights of different wavelengths. In this optical transmission system, since the signal is transmitted using signal lights attained by modulating the light with a signal, transmission capacity can be increased by increasing the multiplexing degree of wavelengths used in the WDM communication, or by increasing the bit rate of modulation.

As an external modulator for modulating the light outputted from a light source with an input signal, and then outputting the modulated signal, a Mach-Zehnder optical modulator is known in which an optical waveguide is formed on a substrate having the electro-optical effect (for example, Japanese Published Unexamined Patent Application No. 2002-182172).

FIGS. 6(a) to 6(d) are structural diagrams and cross-sectional views of a Mach-Zehnder optical modulator formed on a substrate having the electro-optical effect.

The Mach-Zehnder modulators illustrated in FIG. 6(a) and 6(c) include an optical waveguide and electrodes that are formed on a substrate 10A having the electro-optical effect. The input light is modulated and outputted due to mutual operation between the light propagated through the optical waveguide and the electric field generated by the electrodes. For the substrate 10A, lithium niobate (LiNb0$_3$; LN) and LiTa0$_3$ are used. However, since the maximum electro-optical effect can be attained when both the electric field and the polarizing direction of light are in the direction Z, the locations of the signal electrodes and optical waveguide may be different depending on the cutting direction of the substrate.

FIG. 6(a) illustrates a Mach-Zehnder optical modulator using the LN substrate 10A of X-cut, while FIG. 6(b) is a cross-sectional view along the line a–a', shown in FIG. 6(a).

Waveguides 30A–30B, Y-branching waveguides 32A–32B, and parallel waveguides 31A–31B are optical waveguides formed on the substrate 10A. These waveguides are formed, for example, by forming a Ti film and then thermally diffusing the film while the film is patterned into the shape of waveguide, or performing the proton exchange in benzoic acid after a mask material is patterned.

A signal electrode 21A, and ground electrodes 22A and 22B, are formed on a buffer layer 11A formed on the substrate 10A. Electrodes made out of any conductive material, for example, gold (Au), may be used. Some Mach-Zehnder optical modulator may use a LN substrate 10A of the X-cut to attain mutual operation between the light propagated through the parallel waveguides 31A and 31B and the electric field in the direction Z. In such embodiments, the signal electrodes 21A and ground electrodes 22A–22B are formed in the shape of sandwiching the parallel waveguides 31A and 31B.

The light inputted to the optical modulator 2A is propagated through the optical waveguide 30A and is branched to the parallel waveguides 31A and 31B with a Y branching waveguide 32A. The signal electrode 21A is formed as a traveling wave electrode terminated with a resistor 4. An electric signal up to several tens of GHz is impressed to this signal electrode 21A from a signal source 3.

With the electric signal impressed to the signal electrode 21A, an electric field, indicated by the arrow marks of dotted lines in FIG. 6(b), is generated between the signal electrode 21A and the ground electrodes 22A–22B. Since the parallel waveguides 31A and 31B are held by the signal electrode and ground electrodes, the electric field applied to the parallel waveguide 31A is reversed in the direction of the electric field applied on the parallel waveguide 31B, and the refractive indices of the parallel waveguides 31A and 31B are respectively changed as Δn, −Δn.

Accordingly, since the refractive indices of the parallel waveguides 31A and 31B are different than each other, a phase difference is also generated in the lights propagated through the parallel waveguides 31A and 31B. The lights multiplexed with the Y branching waveguide 32B is outputted from the optical waveguide 30B. Such output changes typically depend on phase difference. When the phase difference is equal to a value (=π×odd number), the optical output becomes zero because the lights are cancelled with each other. However, the output is at a maximum when the phase difference is equal to a value (=π×even number).

The examples described above may be applied to a Mach-Zehnder optical modulator formed on a X-cut substrate, and moreover they may also be applied to a similar modulator formed on the Y-cut.

On the other hand, FIG. 6(c) illustrates the Mach-Zehnder type optical modulator that utilizes the Z-cut LN substrate 10A, and FIG. 6(d) is a cross-sectional view along line b–b' of FIG. 6(c).

Like FIG. 6(a), waveguides 30A and 30B, Y branching waveguides 32A and 32B, and parallel waveguides 31A and 31B illustrated in FIG. 6(c), are formed on the substrate 10A, while the signal electrode 21A and ground electrodes 22A and 22B are formed on the buffer layer 11A.

As illustrated in FIG. 6(d), since the direction Z of the electric field resulting in the maximum efficiency of the electro-optical effect is different from that of X-cut in the Mach-Zehnder optical modulator formed on the Z-cut substrate, the parallel waveguide 31A is formed under the signal electrode 21A and the parallel waveguide 31B, under the ground electrode 22B. The buffer layer 11A serves to prevent absorption of the light propagated through the parallel waveguides 31A and 31B by the signal electrode 21A and ground electrode 22B.

SUMMARY OF THE INVENTION

An optical modulator according to an exemplary embodiment of the present invention is capable of preventing or reducing deterioration of modulator characteristic due to mismatching of impedances. This may be accomplished even when an impedance of the region to control light propagated through an optical waveguide is different from the region that inputs an electrical signal due to the electric field formed with an electrical signal applied from the external side.

The Mach-Zehnder optical modulators illustrated in FIGS. 6(a), 6(c) modulate, an input light with an electric field generated with an electric signal applied from a signal source 3. This preferably provides an output.

The Mach-Zehnder optical modulator preferably lowers the electric signal voltage (drive voltage) to simplify the structure of the signal source 3, additionally, the size of the modulator may be reduced because an electric signal up to several tens of GHz is applied to the signal electrode 21A, from the signal source 3. Specifically, when the signal at transmitted in higher bit rate in order to assure larger transmission capacity, it is important to provide a low voltage electric signal because the frequency of the electric signal applied from the signal source 3 becomes higher.

In order to provide a low drive voltage for the Mach-Zehnder optical modulator, it is desirable to adjust the locational relationship among the signal electrode, ground electrode, and optical waveguide. Preferably, this is done to obtain the necessary field intensity with a low drive voltage, for example, to make narrower the electrode interval of the signal electrode and ground electrode.

When the drive voltage is lowered, the impedance of the signal electrode which mutually operates with the parallel waveguides (hereinafter, referred to as impedance of the mutual operation region), becomes lower than about 50 Ω. For example, FIG. 4(*b*) is attained by plotting changes of impedance when the electrode interval of the signal electrode and ground electrode is changed. When the electrode interval is reduced and the drive voltage for obtaining necessary electric field intensity is lowered, impedance may be reduced.

Meanwhile, since the electric signal inputted from the signal source 3 is usually inputted through a coaxial cable or strip-line having impedance of 50 Ω, a part for inputting the electric signal from the external side (hereinafter, referred to as impedance of input region) of the signal electrode of the Mach-Zehnder optical modulator must also be set to about 50 Ω.

Accordingly, when the drive voltage is lowered, the impedance of the input region is different than the impedance of the mutual operation region. Thus, reflection due impedance mismatching is generated. The impedance of input region may be defined as Z1 and the impedance of mutual operation region may be defined as Z2. A reflection coefficient ρ may be expressed As, for example:

ρ=($Z_1$-$Z_2$)/($Z_1$+$Z_2$).

If the impedance $Z_1$ of the input region is different from the impedance $Z_2$, the signal applied to the signal electrode may be partially reflected and the intensity of the electric signal propagated to the signal electrode in the mutual operation region may be lowered, adversely effecting the characteristic of the optical modulator.

FIG. 7 is attained by plotting amount of reflection for the input electric signal frequency measured when the impedance of the input region is different from the impedance of the mutual operation region. Due to the reflection of each portion of the optical modulator, the amount of reflection increases or decreases by a magnitude of several GHz periods and the maximum amount of reflection can be determined with the envelope indicated with the dotted line. For example, the electric signal having a frequency of up to about 10 GHz is inputted to the modulator for the modulation of 10 Gbps, but the amount of reflection of the electric signal in the frequency of about 10 GHz is lowered only up to about −14 dB.

Moreover, to attain the lower drive voltage, it is desirable to match the velocity of light propagated through the parallel waveguides and the propagation velocity of the electric signal in the mutual operation region. When the positional relationship among the signal electrode, ground electrode and optical waveguides is adjusted, the modulation bandwidth of the modulator to the frequency is higher than the desired one.

The present invention solves the problems described above. An optical modulator based on the first invention comprises a substrate having the electro-optical effect, an optical waveguide and ground electrodes formed on the substrate. Also included is a traveling wave electrode which is formed on the substrate and includes a first region to input an electrical signal inputted from the external side, a second region to control the light propagated through the optical waveguide with the electric field generated between the ground electrodes due to the applied electrical signal, and a third region to be provided at the intermediate area between the first region and the second region to propagate the electrical signal to the second region without reflection.

Occasionally, the impedance of the second region is lower than that of the first region due to the allocation of the optical waveguide and electrodes, for example, if the drive voltage is lowered. Even under these conditions, the reflection due to impedance mismatching can be prevented or reduced, allowing the light propagated through the optical waveguide to be controlled very effectively.

An optical modulator based on the second invention comprises a substrate having the electro-optical effect, an optical waveguide and ground electrodes formed on the substrate. Also included is a traveling wave electrode that includes a first region formed on the substrate to input an electrical signal inputted from the external side, a second region to control the light propagated through the optical waveguide due to the electric field generated between the ground electrodes due to the applied electrical signal, and a third region provided at the intermediate area of the first region and the second region. The impedance for the electrical signal of the third region is preferably equal to an intermediate value between the impedance for the electrical signal of the first region, and the impedance for the electrical signal of the second region.

An optical modulator based on the third invention relates to an optical modulator having a third region of the traveling wave electrode that is long enough to shift the phase of the signal element of the electrical signal as much as π/2.

An optical modulator based on the fourth invention relates to an optical modulator having an impedance of the third region of the traveling wave electrode that is substantially equal to the geometric mean of the impedance of the first region of the traveling wave electrode and the impedance of the second region of the traveling wave electrode.

An optical modulator based on the fifth invention relates to an optical modulator having an interval between the traveling wave electrode in the third region and the ground electrodes that is wider than the interval between the traveling wave electrode in the second region and the ground electrode.

An optical modulator based on the sixth invention relates to an optical modulator whose width of the traveling wave electrode in the second region is wider than that of the traveling wave electrode in the third region.

An optical modulator based on the seventh invention relates to an optical modulator where the traveling wave electrode in the second region is thicker than the traveling wave electrode in the third region.

DETAILED DESCRIPTION OF THE PREFERRED EMBODIMENTS

The preferred embodiments of the present invention will be described with reference to the accompanying drawings.

FIG. 1(a) illustrates a Mach-Zehnder optical modulator as a first embodiment of the present invention, while FIGS. 1(b) and 1(c) illustrate cross-sectional views along the line b–b' and c–c' of FIG. 1(a).

Figure 1:
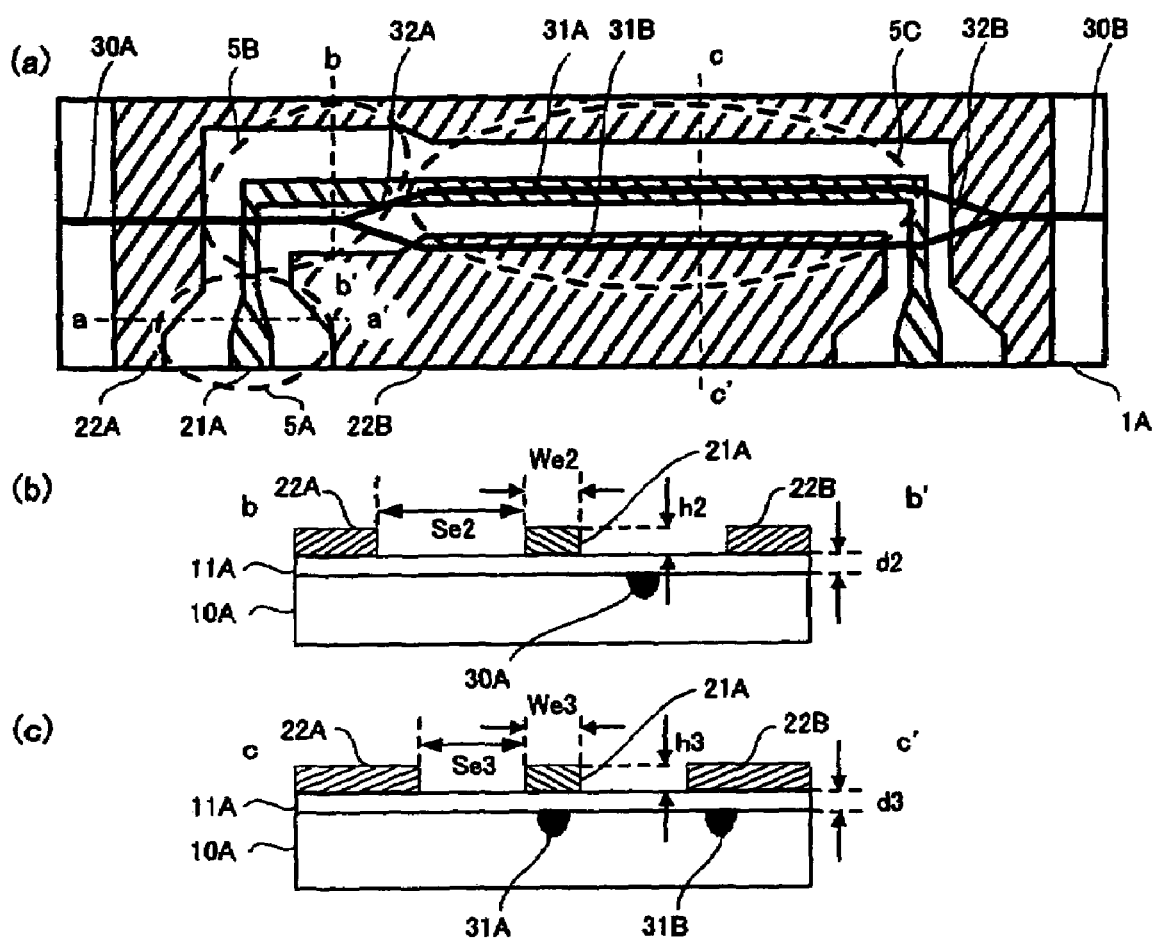
FIGS. 1(a), 1(b) and 1(c) are diagrams showing an optical modulator of an exemplary embodiment of the present invention formed on a Z-cut substrate.

The Mach-Zehnder optical modulator 1A illustrated in FIG. 1 comprises an optical waveguide and electrodes that are formed on a Z-cut substrate 10A having the electro-optical effect. In one embodiment, an input light is modulated and outputted through mutual operation between the light propagated through the optical waveguide and an electric field generated by electrodes. In one embodiment, the substrate 10A may comprise a combination of a lithium niobate ($LiNbO_3$: LN) and $LiTaO_3$ having the electro-optical effect.

In one embodiment, waveguides 30A and 30B, Y branching waveguides 32A and 32B and parallel waveguides 31A and 31B are optical waveguides formed on the substrate 10A. These optical waveguides may be formed, for example, by forming a Ti film and then thermally diffusing this film while the film is patterned in the shape of a waveguide. Alternately, the Ti film may be thermally diffused by the proton exchange within the beonzoic acid after the patterning of a mask material.

The buffer layer 11A has a refractive index that is smaller than that of the substrate 10A and absorbs a smaller amount of light. In one embodiment, this layer may be formed using the sputtering method, CVD method, evaporation method, spin coating method, or the like, using, for example, $SiO_2$, $MgF_2$, $Al_2O_3$, etc.

In one embodiment a signal electrode 21A and ground electrodes 22A–22B are formed on the buffer layer 11A formed on the substrate 10A. Any type of electrodes, for example, gold (Au) electrodes, may be used.

The ground electrodes 22A and 22B may be grounded and the signal electrode 21A may be formed as the traveling wave electrode terminated with a resistor, not illustrated, from a contact in the right side of the drawing closest to the optical waveguide 30B of FIG. 1(a). An electric signal may be applied thereto from a contact in the left side of the drawing near the optical waveguide 30A of FIG. 1(a).

Figure 6:
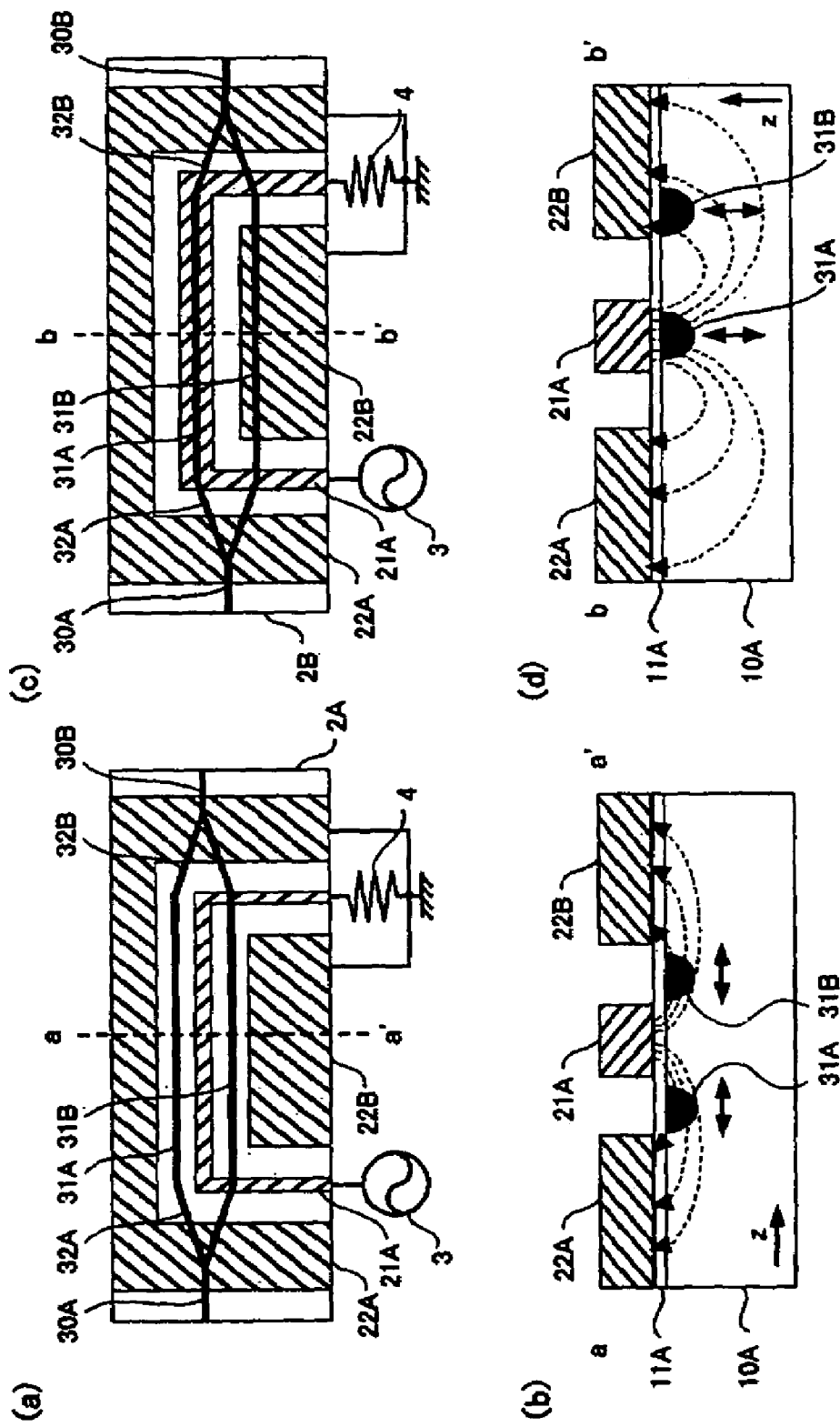
FIGS. 6(a), 6(b), 6(c) and 6(d) are diagrams illustrating one embodiment of a Mach-Zehnder optical modulator.

In some embodiments, an electric field may be generated as indicated by the dotted arrow shown in FIG. 6(d), between the signal electrode 21 and ground electrodes 22A–22B. The electric signal may be applied to the signal electrode 21A, and thereby the refractive indices of the parallel waveguides 31A and 31B are varied respectively as, for example, $+\Delta n$, $-\Delta n$.

Accordingly, since the refractive indices of the parallel waveguides 31A and 31B are different in one embodiment the light is multiplexed with the Y branching waveguide 32B modulated with the electric signal applied from a signal source, not illustrated, and is then outputted from the waveguide 30B.

In one embodiment, the signal electrode and ground electrodes maybe respectively defined as the input region 5A, impedance adjusting region 5B and mutual operation region 5C. Region 5C may correspond to the first to third regions, depending on the shape, allocation and impedance.

In the input region 5A, the width of signal electrode 21A is preferably thick at the substrate end face that is used to input the signal with a coaxial cable from the signal source which is not illustrated. This signal electrode is preferably tapered to become thin towards the inside of substrate, as illustrated in FIG. 1(a). The impedance of the input region 5A is preferably 50 Ω and is matched with the output impedance of the signal source which is not illustrated. Since the impedance of input region 5A is 50 Ω, as the width of signal electrode 21A is tapered to become thin, the interval between the signal electrode 21A and ground electrodes 22A–22B also becomes narrow.

As illustrated in FIG. 1(c), since the refractive indices of the parallel waveguides 31A and 31B vary with the electric field generated between the signal electrode 21A and ground electrodes 22A–22B in the mutual operation region 5C, the output light is multiplexed with the Y branching waveguide 32B and is propagated through the optical waveguide 30B. This converts the signal to the modulated signal light.

In one embodiment, the signal electrode 21A and ground electrodes 22A–22B, formed on the Z-cut substrate 10A, are provided with an impedance adjusting region 5B between the input region 5A and mutual operation region 5C.

Figure 3:
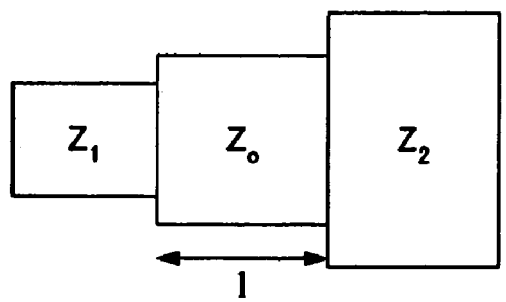
FIGS. 3(a) and 3(b) are diagrams illustrating impedance matching.
Figure 3:
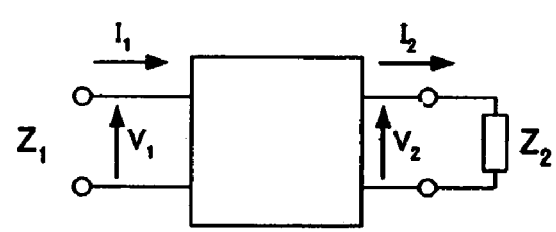

Here, impedance matching will be described with reference to FIG. 3. The three regions having different impedances based on the signal electrode 21A and ground electrodes 22A–22B are assumed to be operatively connected with a distributed constant circuit as illustrated in FIG. 3(a). The impedance of the input region may be defined as Z1, the impedance of mutual operation region as Z2, the impedance of impedance adjusting region as Z0 and length as 1.

When the impedance adjusting region are a 2-terminal pair network, a voltage and a current in FIG. 3(b) may be expressed as, for example, using a propagation constant γ:

$$V_1 = V_2 \cos h\gamma 1 + I_2 \sin h\gamma 1$$

$$I_1 = (V_2/Z_0) \times \sin h\gamma 1 + I_2 \cos h\gamma 1$$

When the equations are solved under the condition that the right and left impedance ($V_1/I_1$) of the terminal pair 1–1' is defined as Z1, while the right and left impedance ($V_2/I_2$) of the terminal pair 2–2' is defined as Z2, the following solution can be obtained:

$$\cos h\gamma 1 = \cos hj\beta 1 = 0$$

Here, the phase constant β satisfies the relationship of the following equation, and is also the imaginary part of γ.

$$\beta = 2\pi/\lambda$$

By combining these equations, the following may be obtained:

$$I=\{(1/4)+(n/2)\}\lambda(n=0, 1, 2, \ldots)$$

$$Z_0=\sqrt{Z1\cdot Z2}$$

This shows that the impedance of the impedance matching region becomes equal to the geometric mean of the impedance of input region and impedance of mutual operation region. This also shows that when the length of impedance adjusting region is equal to the length for changing the phase of the RF signal applied to the signal electrode as much as π/2 (¼ wavelength), reflection does not occur when the electric signal is transmitted to the mutual operation region through the impedance adjusting region from the input region. This provides the advantage of allowing the electric signal to be transmitted more effectively than when the impedance adjusting region is not provided.

In the FIG. 1 embodiment, deterioration of the modulator characteristic may be caused by impedance mismatching of the mutual operation region, for example, when the drive voltage is lowered by adjusting, conforming to the conditions described above, the positional relationship among the signal electrode 21 and ground electrodes 22A–22B and the optical waveguide. This deterioration may be prevented and reduced by setting the impedance of the impedance adjusting region 5B, provided between the input region 5A and mutual operation region 5C, to prevent or suppress reflection of electric signal due to impedance mismatching.

Figure 2:
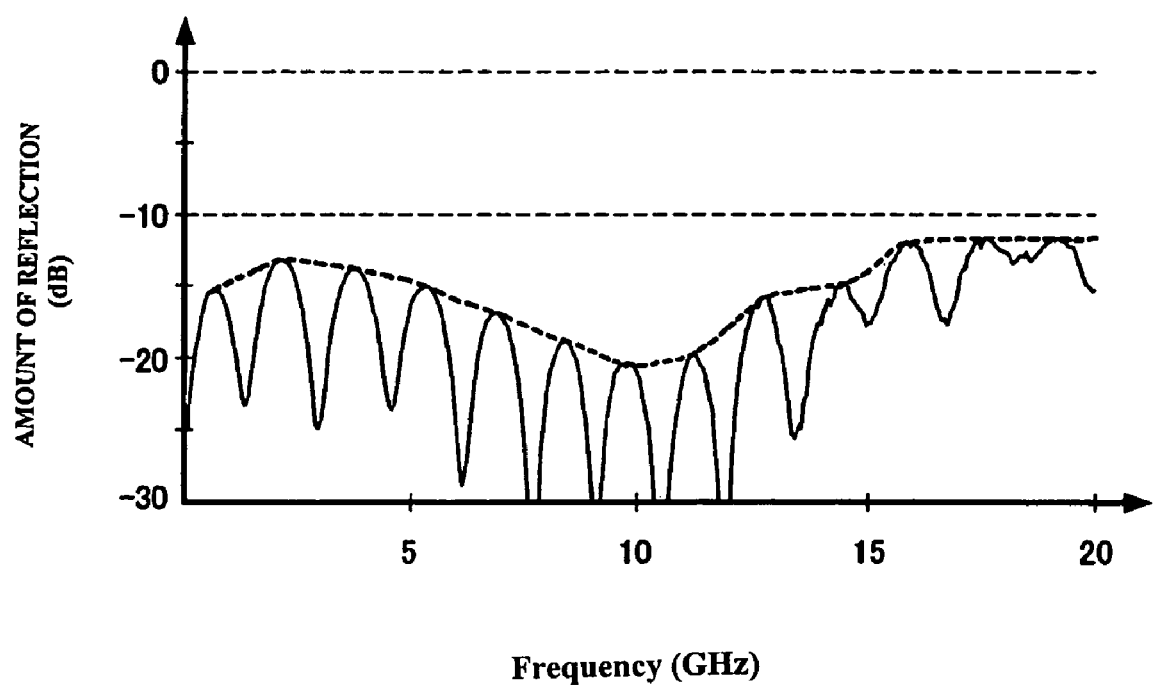
FIG. 2 is a diagram illustrating the reflection characteristic of the optical modulator according to one embodiment of the present invention.
Figure 7:
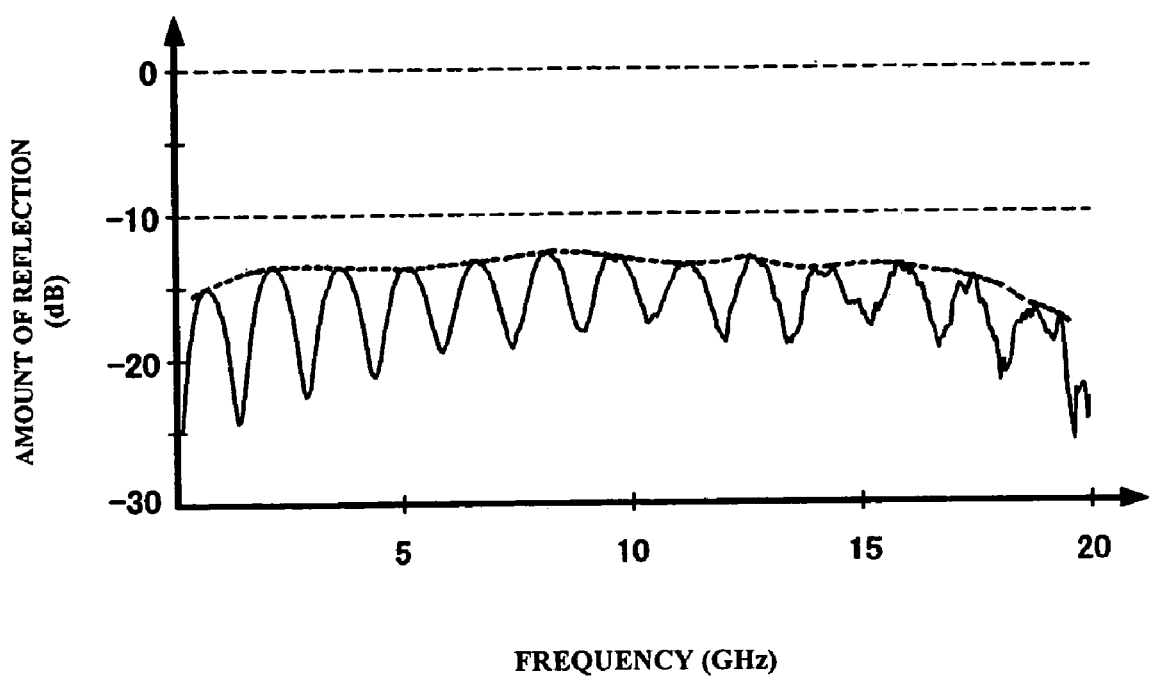
FIG. 7 is a diagram illustrating the reflection characteristics of an optical modulator of the related art.

FIG. 7 is a graph showing the amount of reflection of the input electric signal over a frequency range. The graph is generated when the impedance of input region is different from the impedance of mutual operation region. FIG. 2 shows that the impedances of the input region and mutual operation region are identical to that in FIG. 7. It also shows that the impedance adjusting region is provided between the input region and the mutual operation region.

As in the case of exemplary FIG. 7, the amount of reflection increases or decreases in every period due to the reflection at each portion of the optical modulator. The maximum amount of reflection may be determined using the envelope indicated by the dotted line. In exemplary FIG. 7, the amount of reflection of the electric signal near the frequency of 10 GHz, is about −14 dB, but the amount of reflection of the electric signal near the frequency of 10 GHz can be improved up to −20 dB or less in FIG. 2 because the impedance adjusting region is provided to reduce the reflection of the electric signal.

Next, an exemplary method of adjusting the impedance of the impedance adjusting region will be described. FIGS. 1(b) and 1(c) are respectively cross-sectional views of the impedance adjusting region (b–b') and mutual operation region (c–c'). In one embodiment, reflection may be prevented or reduced, by respectively setting the buffer layer thickness values d2–d3, signal electrode thickness values h2–h3, signal electrode width values We2–We3, and electrode interval values Se2 and Se3 of the impedance adjusting region and mutual operation region to different values.

For example, as illustrated in FIGS. 1(b) and 1(c), the impedance of the impedance adjusting region can be set to an intermediate value between the impedance of input region and impedance of mutual operation region. Moreover, reflection due to impedance mismatching can be lowered by setting the electrode interval Se2 between the signal electrode and ground electrodes of the impedance adjusting region to a value which is larger than the electrode interval Se3.

FIGS. 4(a) to 4(d), respectively, illustrate exemplary graphs obtained by plotting variations in impedance when the signal electrode width, electrode interval between the signal electrode and ground electrodes, buffer layer thickness, and electrode thickness, are changed. In the impedance adjusting region, the impedance of the electric signal of the target frequency can be adjusted by utilizing the relationships illustrated in FIGS. 4(a) to 4(d). Moreover, in the mutual operation region, a variation in impedance when the refractive index of the RF signal is changed, or when the drive voltage is changed, can be estimated for velocity matching between the velocity of light propagated through the optical waveguide and the velocity of the RF signal propagated through the electrodes.

The propagation velocity v of the electric signal can be expressed as, for example:

$$v=1/\sqrt{\mu\epsilon\epsilon_o}$$

when the specific dielectric constant is ϵ, a refraction index n for the electric signal can be expressed by, for example:

$$n=c/v=\sqrt{\mu\epsilon\epsilon_o}/\sqrt{\mu_o\epsilon_o}=\sqrt{\epsilon}$$

where, the permeability μ is approximated to be equal to $\mu_o$.

Figure 4:
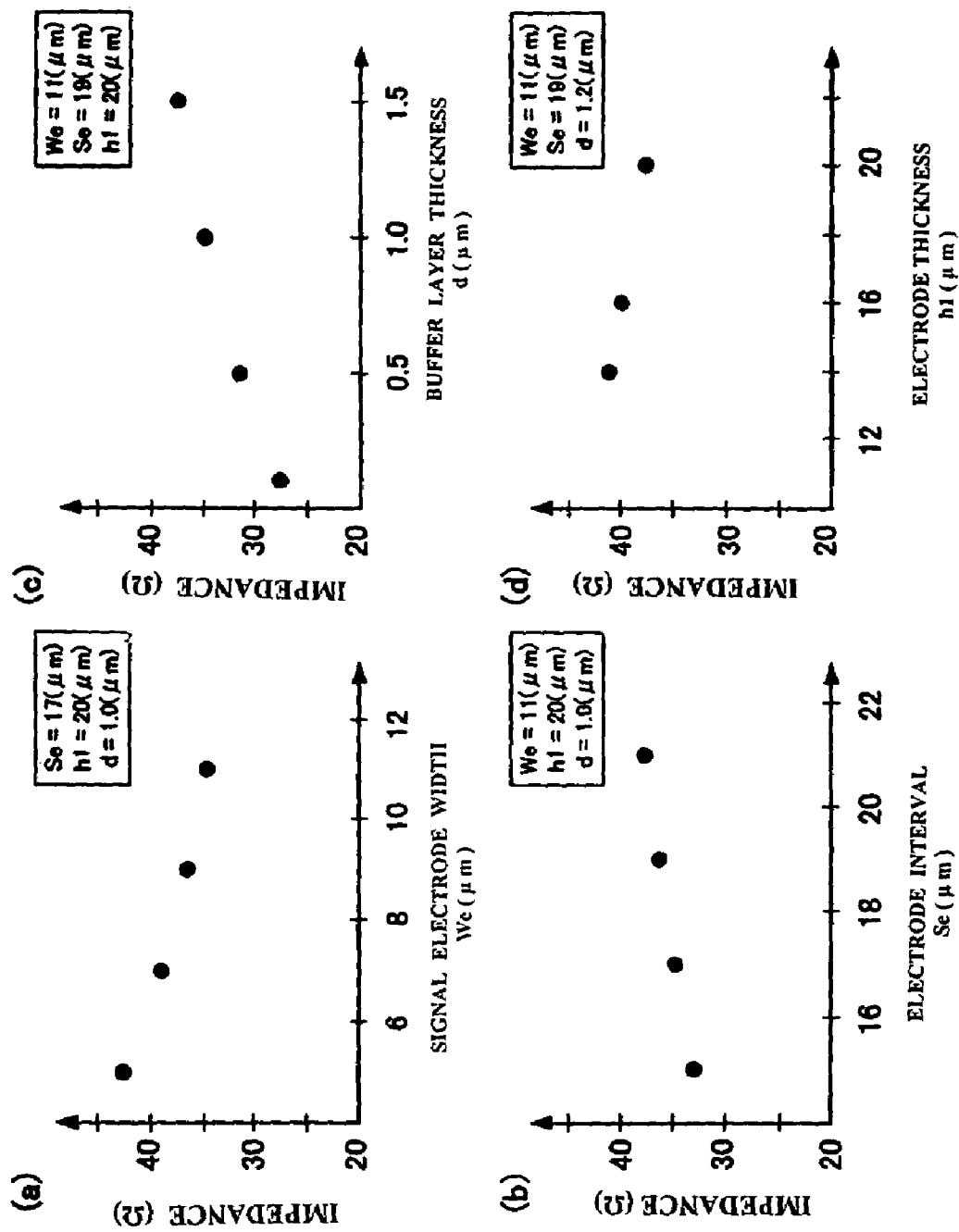
FIGS. 4(a), 4(b), 4(c) and 4(d) are diagrams illustrating impedance change when the exemplary electrodes and buffer layer are varied.

FIG. 4(a) can be obtained by plotting the change in impedance when the signal electrode width is varied when the electrode interval is about 17 (μm), signal electrode thickness is about 20 (μm) and buffer layer thickness is about 1.0 (μm). In this figure, the impedance value can be reduced by widening the signal electrode width. When the signal electrode width is widened in the mutual operation region, the voltage difference between electrodes required for applying the predetermined electric field to the parallel waveguide is lowered. Accordingly, the drive voltage is lowered. Moreover, the refractive index for the RF signal can be increased by widening the signal electrode width.

FIG. 4(b) can be obtained by plotting a change in impedance when the electrode interval between the signal electrode and ground electrodes is varied when the signal electrode width is about 11 (μm), signal electrode thickness is about 20 (μm) and the buffer layer thickness is about 1.0 (μm). In this figure, the impedance is increased by widening the electrode interval. When the electrode interval between the signal electrode and the ground electrodes is in the mutual operation region, the drive voltage increases because the electrode-to-electrode voltage difference required for application of the predetermined electric field to the parallel waveguide increases. Moreover, the refractive index of the electric signal can be increased by widening the electrode interval.

FIG. 4(c) can be obtained by plotting the change in impedance when the buffer layer thickness is varied when the signal electrode width is about 11 (μm), electrode interval is about 19 (μm) and the signal electrode thickness is about 20 (μm). The impedance is increased by making thick the buffer layer thickness. In one embodiment, when the thick buffer layer is formed in the mutual operation region, the drive voltage is increased because an electrode-to-electrode voltage difference required for application of the predetermined electric field to the parallel waveguide increases. Moreover, the refractive index for the RF signal is decreased by forming the thick buffer layer. In one embodiment, the drive voltage can be decreased by forming the thin buffer layer. However, since the Z-cut substrate is used in the one embodiment and the signal electrode or ground electrode is located on the optical waveguide, if the buffer layer is formed in the excessively smaller thickness, absorption of light with the electrode is increased, exceeding a negligible amount.

FIG. 4(d) can be obtained by plotting the change in impedance when the electrode thickness of the signal electrode is varied when the signal electrode width is about 11 (μm), the electrode interval is about 19 (μm), and the buffer layer thickness is about 1.2 (μm). The impedance is preferably reduced when the thick electrode is formed. When the thick electrode is formed in the mutual operation region, the drive voltage does not change because the electrode-to-electrode voltage difference required for application of the predetermined electric field to the parallel waveguide does not change. Moreover, the refractive index for the RF signal is reduced by forming the thick electrode.

Accordingly, the velocity matching between the velocity of light propagated through the optical waveguide and the velocity of the RF signal propagated through the electrodes is performed first in the mutual operation region. This is done by varying the signal electrode width, electrode interval between the signal electrode and ground electrodes, buffer layer thickness, and electrode thickness of the signal electrode described above. Additionally, a change in impedance is estimated when the drive voltage adjustment is varied. Thereafter, in view of suppressing or reducing reflection of the electric signal of the target frequency from the impedance of input region and impedance of the mutual operation region, the impedance of the impedance adjusting region may be adjusted by varying the signal electrode width, electrode interval between the signal electrode and ground electrodes, buffer layer thickness and electrode thickness of the signal electrode described above.

Figure 5:
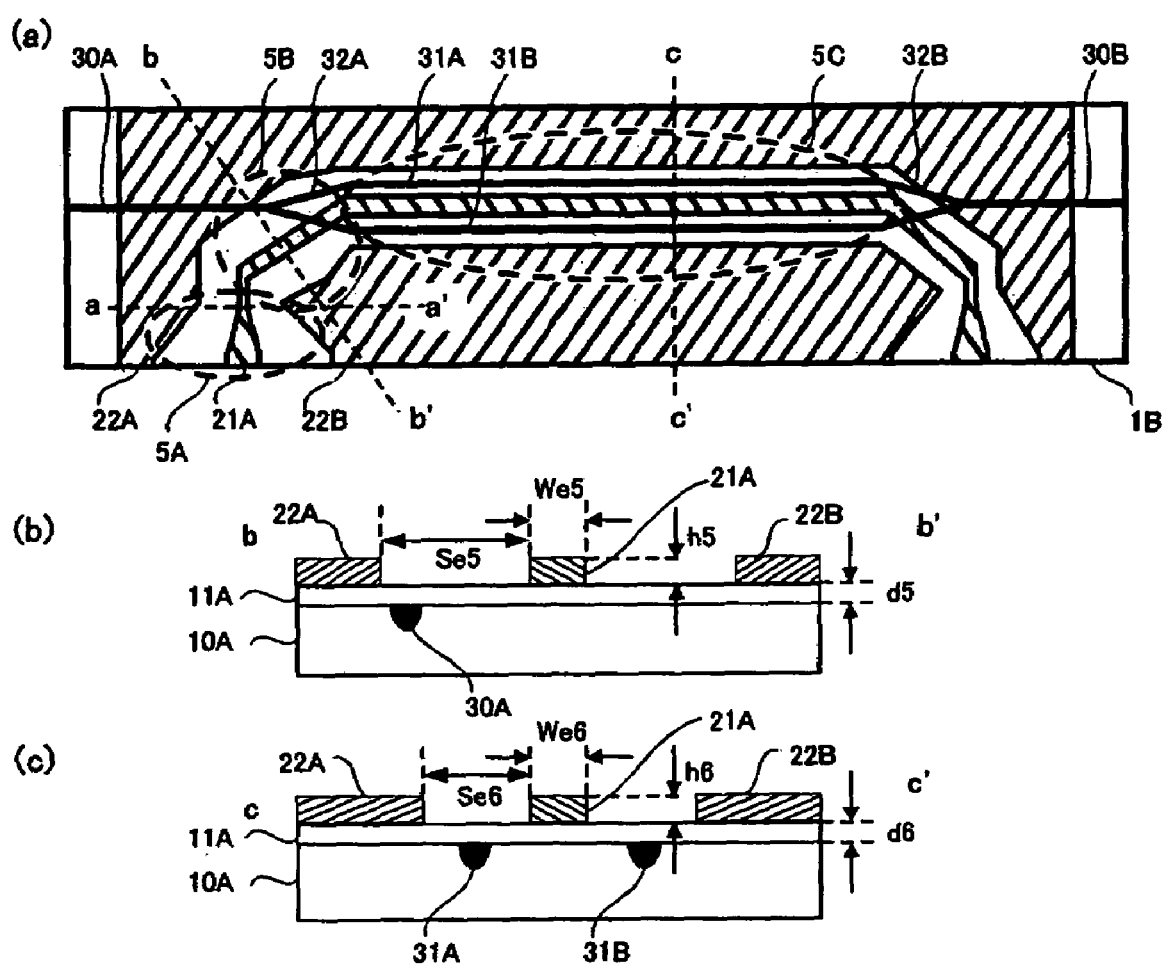
FIGS. 5(a), 5(b) and 5(c) are diagrams illustrating an optical modulator according to one embodiment of the present invention formed on the X-cut substrate.

Next, the optical modulator of another exemplary embodiment of the present invention will be described. FIG. 5(a) illustrates a Mach-Zehnder optical modulator based on another embodiment of the present invention. FIGS. 5(b) and 5(c) respectively illustrate the cross-sectional views along the lines b–b', c–c' of FIG. 5(a).

This embodiment proposes a structure in which an impedance adjusting region is provided in the Mach-Zehnder optical modulator formed on the X-cut substrate having the electro-optical effect.

In the optical modulator 1B illustrated in FIG. 5(a), the waveguides 30A–30B, Y branching waveguides 32A–32B, and parallel waveguides 31A–31B are optical waveguides formed on the substrate 10A. In one embodiment these optical waveguides may be formed by forming, for example, a Ti film. The film is then thermally diffused under while the Ti film is patterned into the shape of waveguide. Alternatively, proton exchange in the benzoic acid after the patterning of a mask material may be performed.

In one embodiment, the buffer layer 11A has smaller in the refractive index than the substrate 10A, and absorbs a smaller amount of light. Accordingly, the buffer layer 11A may be formed using any method, such as the sputtering method, CVD method, evaporation method, and spin coating method from the $SiO_2$, $MgF_2$, $Al_2O_3$ or the like. In one embodiment, the signal electrode 21A and ground electrodes 22A–22B are formed on the buffer layer 11A formed on the substrate 10A. The electrodes may be made out of any material, for example, gold (Au).

In one embodiment of the Mach-Zehnder optical modulator, the signal electrode 21A and ground electrodes 22A–22B may be formed in the area where the parallel waveguides 31A–31B do not exist. Each electrode is preferably provided in both sides of the parallel waveguides 31A–31B so that mutual operation occurs between the light propagated through the parallel waveguides 31A–31B and the electric field in the direction Z.

In one embodiment, the light inputted to the optical modulator 1B is propagated through the optical waveguide 30A and is branched to the parallel waveguides 31A–31B with the Y branching waveguide 32A. The ground electrodes 22A–22B may be grounded, and the signal electrode 21A may be formed as the traveling wave electrode terminated with a resistor, not illustrated, from the right side contact (in the figure) near the optical waveguide 30B of FIG. 2(a). The RF signal is preferably applied thereto from the left side contact near the optical waveguide 30A of FIG. 2(a).

With the RF signal applied to the signal electrode 21, the electric field is generated as indicated with the arrow mark of dotted lines in FIG. 6(b) between the signal electrode 21A and ground electrodes 22A, 22B and the refractive indices of the parallel waveguides 31A, 31B are respectively changed as $+\Delta n$ and $-\Delta n$.

Accordingly, since the refractive indices of the parallel waveguides 31A and 31B are different, the light multiplexed with the Y branching waveguide 32B is modulated with the RF signal applied from the signal source 3, and is then outputted from the waveguide 30B.

The signal electrode and ground electrodes are respectively defined as the input region 5A, impedance adjusting region 5B, and mutual operation region 5C corresponding to the first to third regions depending on, for example, the shape, allocation and impedance thereof.

In the input region 5A, the signal electrode 21 is formed thick at the end face of substrate in order to input the signal from the signal source not illustrated using a coaxial cable or the like. It is preferably tapered to become thin towards the inside of substrate as illustrated in FIG. 5(a). The impedance of the input region 5A is about 50 Ω and is matched with the output impedance of the signal source, not illustrated. Since the impedance of the input region 5A is set to 50 Ω, the intervals among the signal electrode 21A and ground electrodes 22A and 22B also become narrow because the electrode width of the signal electrode 21A is tapered to become narrow.

As illustrated in FIG. 5(c), since the refractive indices of the parallel waveguides 31A–31B are varied due to the electric field among the signal electrode 21A and ground electrodes 22A–22B in the mutual operation region 5C, the optical signal is multiplexed with the Y branching waveguide 32B. The output light propagated through the optical waveguide 30B is preferably converted to the modulated optical signal.

The signal electrode 21A and ground electrodes 22A–22B formed on the X-cut substrate 10A are provided with the impedance adjusting region 5B between the input region 5A and mutual operation region 5C.

In one embodiment, the impedance in the impedance adjusting region becomes equal to the geometric mean of the impedance in the input region and the impedance in the mutual operation region. The length of the impedance adjusting region is enough to vary the phase of the RF signal applied to the signal electrode as much as $\pi/2$ (¼ wavelength). Any reflection generated when the RF signal is propagated to the mutual operation region through the impedance adjusting region from the input region, the RF signal can be transmitted more effectively than the case where the impedance adjusting region is not provided.

In FIGS. 5(a), deterioration of modulator characteristic due to mismatching of impedance in the mutual operation region when the drive voltage is lowered by adjusting the positional relationship among the signal electrode 21A, ground electrodes 22A–22B, and optical waveguide can be prevented or reduced by fitting the impedance of impedance adjusting region 5B provided between the input region 5A and mutual operation region 5C to the conditions described above in order to prevent or suppress the reflection of signal due to impedance mismatching.

FIGS. 5(b) and 5(c) are cross-sectional views in the impedance adjusting region (b–b') and mutual operation region (c–c'), respectively. The impedance adjusting region can be provided to prevent or reduce the reflection of a signal by setting the values d5 and d6 of buffer layer thickness, values h5 and h6 of signal electrode thickness, values We5 and We6 of signal electrode width, and values of electrode interval Se5 and Se6 of the impedance adjusting region and mutual operation region to different values.

Deterioration of modulator characteristic due to mismatching of impedance for the mutual operation region can be prevented or reduced, by adjusting the impedance of impedance adjusting region. This can be done by changing the signal electrode width, the electrode interval between signal electrode and ground electrodes, and the buffer layer thickness and electrode thickness illustrated in FIGS. 4(a) to 4(d). Although the present invention has been described with reference to particular embodiments, it will be understood to those skilled in the art that the invention is capable of a variety of alternative embodiments within the spirit of the appended claims.

The invention claimed is:

1. An optical modulator, comprising:
a substrate having the electro-optical effect;
an optical waveguide and ground electrodes formed on said substrate; and
a traveling wave electrode formed on said substrate including a first region to input an externally applied electrical signal, a second region to control the light propagated through said optical waveguide with an electric field generated between said ground electrodes due to said applied electrical signal, and a third region provided at the intermediate region between said first region and said second region to propagate said electrical signal to said second region without any reflection, wherein the impedance is static in the third region.

2. The optical modulator according to claim 1, wherein the length of said third region of said traveling wave electrode is sufficient to shift the phase of the signal element of said electrical signal as much as $\pi/2$.

3. The optical modulator according to claim 1, wherein the impedance of said third region of said traveling wave electrode is equal to the geometric mean of the impedance of said first region and the impedance of said second region of said traveling wave electrode.

4. The optical modulator according to claim 1, wherein an interval between said traveling wave electrode in said third region and said ground electrodes is wider than the interval between said traveling wave electrode in said second region and said ground electrodes.

5. The optical modulator according to claim 1, wherein the width of said traveling wave electrode in said second region is wider than the width of said traveling wave electrode in said third region.

6. The optical modulator according to claim 1, wherein said traveling wave electrode in said second region is thicker than said traveling wave electrode in said third region.

7. An optical modulator, comprising:
a substrate having the electro-optical effect;
an optical waveguide and ground electrodes formed on said substrate; and
a traveling wave electrode formed on said substrate including a first region to input an externally applied electrical signal, a second region to control the light propagated through said optical waveguide with an electric field generated with said applied electrical signal between said ground electrodes, and a third region provided at the intermediate region between said first region and second region, wherein an impedance for said electrical signal of said third region is equal to an intermediate value between the impedance for said electrical signal of said first region and the impedance for said electrical signal of said second region, wherein the impedance is static in the third region.

8. The optical modulator according to claim 7, wherein the length of said third region of said traveling wave electrode is sufficient to shift the phase of the signal element of said electrical signal as much as $\pi/2$.

9. The optical modulator according to claim 7, wherein the impedance of said third region of said traveling wave electrode is equal to the geometric mean of the impedance of said first region and the impedance of said second region of said traveling wave electrode.

10. The optical modulator according to claim 7, wherein an interval between said traveling wave electrode in said third region and said ground electrodes is wider than the interval between said traveling wave electrode in said second region and said ground electrodes.

11. The optical modulator according to claim 7, wherein the width of said traveling wave electrode in said second region is wider than the width of said traveling wave electrode in said third region.

12. The optical modulator according to claim 7, wherein said traveling wave electrode in said second region is thicker than said traveling wave electrode in said third region.

* * * * *